United States Patent
Smerald et al.

(10) Patent No.: US 10,348,811 B2
(45) Date of Patent: Jul. 9, 2019

(54) SERVICE TO INVOKE COMPANION APPLICATIONS

(71) Applicant: EMC Corporation, Hopkinton, MA (US)

(72) Inventors: Peter D. Smerald, New London, NH (US); Gilda R. Hashemian, Ellicott City, MD (US); Howard A. Boblett, Martinsville, VA (US); Benjamin W. Hardwick, Monroe Township, NJ (US); Brian H. Branum, Garden Ridge, TX (US); James R. Odom, Jr., Kingwood, TX (US); Phi Dang, San Jose, CA (US); Dinesh Ramvel Somalingam, Stouffville (CA)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 15/816,847

(22) Filed: Nov. 17, 2017

(65) Prior Publication Data

US 2018/0159917 A1    Jun. 7, 2018

Related U.S. Application Data

(63) Continuation of application No. 14/319,806, filed on Jun. 30, 2014, now Pat. No. 9,854,026.

(51) Int. Cl.
*H04L 29/08* (2006.01)
*H04L 29/06* (2006.01)

(52) U.S. Cl.
CPC .............. *H04L 67/10* (2013.01); *H04L 67/02* (2013.01); *H04L 67/40* (2013.01)

(58) Field of Classification Search
None
See application file for complete search history.

(56) References Cited

U.S. PATENT DOCUMENTS

| | | |
|---|---|---|
| 6,948,120 B1 | 9/2005 | Delgobbo |
| 8,818,865 B2 | 8/2014 | Trifon |
| 8,965,952 B1 | 2/2015 | Shatalin |
| 2002/0080165 A1 | 6/2002 | Wakefield |
| 2003/0061283 A1 | 3/2003 | Dutta |
| 2009/0327855 A1 | 12/2009 | Le |
| 2010/0299589 A1 | 11/2010 | Yamada |
| 2010/0325715 A1 | 12/2010 | Deurbrouck |
| 2010/0332837 A1 | 12/2010 | Osterwalder |
| 2011/0271175 A1 | 11/2011 | Lavi |
| 2012/0036265 A1 | 2/2012 | Meyler |

*Primary Examiner* — Thomas J Dailey
(74) *Attorney, Agent, or Firm* — Van Pelt, Yi & James LLP

(57) ABSTRACT

A service to invoke a companion application or service is disclosed. In various embodiments, an indication to invoke a companion application is received in the context of a display page of a calling application. A service a call comprising a filtered set of data values derived from the display page is sent to an external service. A request associated with the companion application is received from the external service and used to invoke the companion application.

20 Claims, 7 Drawing Sheets

SERVICE TO INVOKE COMPANION APPLICATIONS

CROSS REFERENCE TO OTHER APPLICATIONS

This application is a continuation of co-pending U.S. patent application Ser. No. 14/319,806 entitled SERVICE TO INVOKE COMPANION APPLICATIONS filed Jun. 30, 2014, which is incorporated herein by reference for all purposes

BACKGROUND OF THE INVENTION

Previous approaches to build context between two disconnected applications typically have required human interaction and/or the development of costly integration code. For example, in some prior approaches a contextual relationship has been established between a primary application and a companion application by having a human user rekey information from one screen into another. The user was required to remember which companion application was appropriate, understand which data was relevant to establish meaningful context between the applications, and re-enter the data without error. In many cases, this approach required substantial cost to educate users, as well as introduced a significant level of discontent among users. Additionally, the cost of making a mistake, as well as the potential regulatory risk of a mistake, could be high.

In other approaches, context between disconnected applications has been established by creating custom programmatic integrations between the applications. These typically are rigid integrations that must be developed for every pair of applications and application versions. In addition to the time and cost of writing these integrations, every time one of the two applications change the company typically must regression test both applications. This is a considerable expense and delays upgrades of all affected systems.

Several vendors offer programs that are capable of extracting data from screens and passing that information to another application. These interfaces use a script driven approach that store the configurations on the users' desktops—potentially creating a training and quality of work issue. Additionally, this method introduces a separate install onto the client machine as well as the need for client configurations to exist. Finally, the relationship between the calling application and the companion application is not maintained in a central area. Changes to any of the applications require widespread distribution of those changes.

BRIEF DESCRIPTION OF THE DRAWINGS

Various embodiments of the invention are disclosed in the following detailed description and the accompanying drawings.

DETAILED DESCRIPTION

Figure 1:
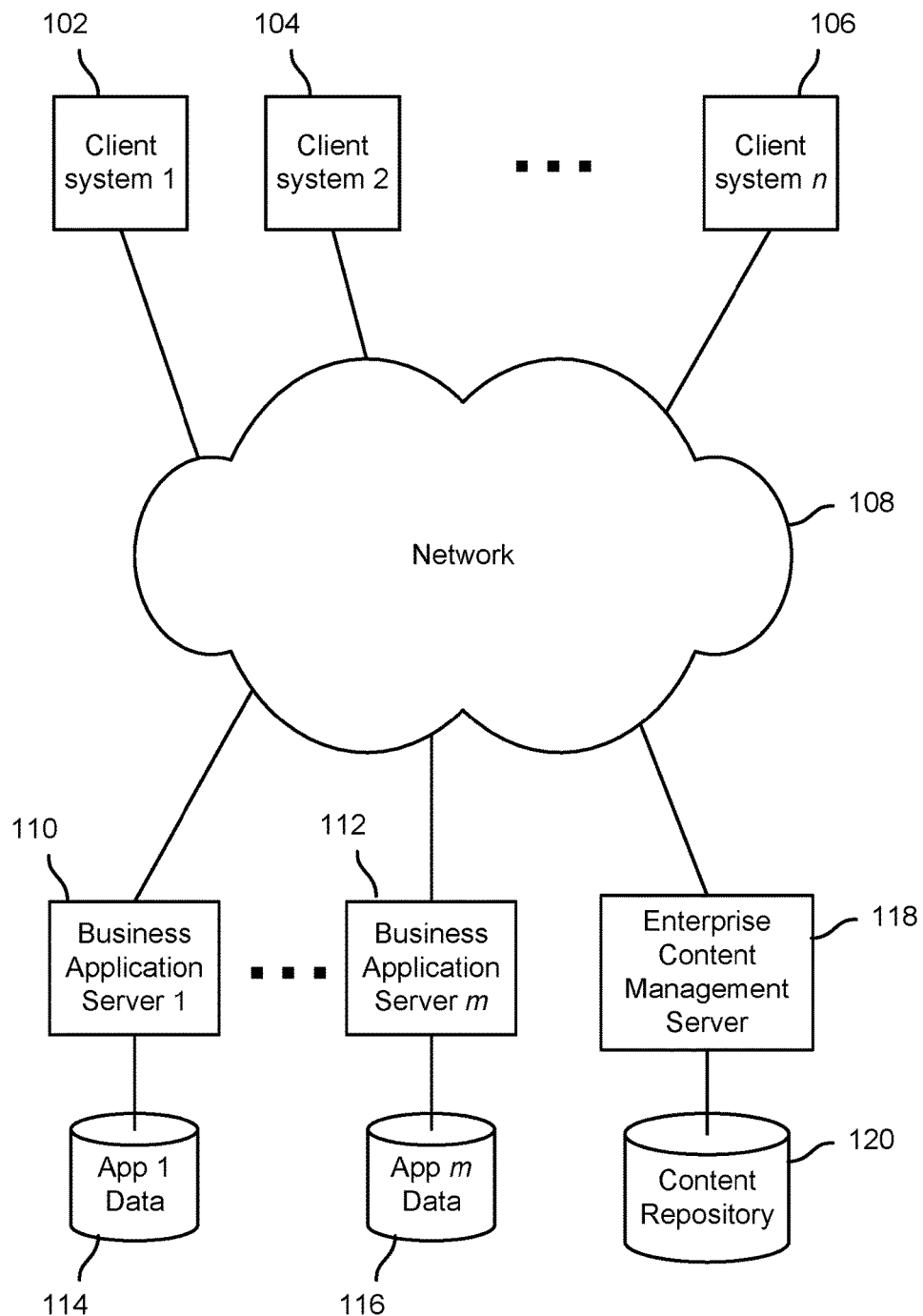
FIG. 1 is a block diagram illustrating an embodiment of an example system and service to invoke a companion application or service.

The invention can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details.

A service-based architecture and approach to invoke a companion (or other external) application or service is disclosed. In various embodiments, a browser plug-in or other browser executable code is provided to enable user of a web-based or other application on a client system to invoke an external companion application or service without requiring configuration data and/or integration code on the client. For example, in some embodiments, a browser installed on a client system may be used to access a web-based business application (referred to herein in various embodiments as a "calling application"). A plug-in or other browser extension enables the user to invoke a second, external application (referred to in various embodiments a "companion" application) by selecting a button or other control. A filtered set of HTML tags is generated by traversing code comprising a currently displayed page of the calling application. HTML as used herein includes any type of Standard Generalized Markup Language (SGML) including HTML, HTML5, XML or other suitable SGML. The filtered set of HTML tags in various embodiments includes for each of one or more HTML elements comprising the page an identification of the tag and a corresponding data value. A web services call is made, including by sending the filtered set of HTML tags to the web service. The web service returns a fully formed HTTP request usable by the browser at the client system to retrieve and display in a new window or tab a display page of the companion application (or service). In various embodiments, the received HTTP request includes one or more parameters that result in the companion application providing in response to the HTTP request a page that reflects a business or other context of the calling application.

FIG. 1 is a block diagram illustrating an embodiment of a system and service to invoke a companion application or service. In the example shown, a plurality of client systems 1 to n, represented in FIG. 1 by client systems 102, 104, and 106, have access via a network 108 (e.g., the Internet) to a plurality of business (or other) applications (and/or services), each running on one or more business application servers 1 to m, represented in FIG. 1 by application servers 110 and 112. Examples of business applications include, without limitation, web-based business productivity applications and services, such as Salesforce.com®, SAP®, and Oracle®. Each application server (e.g., 110 and 112) has an associated database (i.e., 114 and 116, respectively, in the example shown in FIG. 1) in which business application data is stored. In the example shown, an enterprise content management (ECM) server 118 provides access to a content repository 120.

In various embodiments, users of client systems such as 102, 104, and 106 may access applications and/or services from application servers such as 110 and 112 using a web browser. For example, a user may navigate to a starting web or other application display page of a web-based application, enter a user identifier and/or password, and gain access to use of the application or service, including in various embodiments to application data associated with the user. In various embodiments, a browser plug-in or other browser executable code is provided to and installed on client systems such as 102, 104, and 106 to enable users to invoke a companion application from the context of a displayed page of a calling application, including by providing to the companion application or service a business context data of the calling application. In the example shown in FIG. 1, for example, the companion application may be the ECM server 118 and associated content repository 120. For example, a user of a business application provided via an application server such as 110 or 112 may desire to retrieve from content repository 120 content items associated with a business application context of the business application the user is using. For example, in the case of a customer relationship management (CRM) application or service (e.g., Salesforce.com®), a user may wish to retrieve from content repository 120 documents or other content associated with a customer, a particular sale or sales lead with respect to a customer, etc. The user may have navigated to a business application page that provides access to customer and/or account information and entered the customer's name and/or other identifying information, possibly resulting in application data associated with the customer being retrieved and displayed.

In some embodiments, the companion application (in this example, the ECM application/system) may be invoked by activating a control displayed by the browser by operation of a browser plug-in. The plug-in and/or associated code parses the calling application's display page code to generate a filtered set of HTML tags and associated data values. For example, for a given business application page, the plug-in may gather the "title" and "h1" (heading level 1) tags and associated data values. Example of data values may include, without limitation, application data values associated with a particular instance and/or state of the page. For example a page may have an "h1" tag having a "customer" attribute, which in a given state may have a data value associated with a particular customer, such as that customer's name or other identity. In various embodiments, the filtered set of HTML tags and associated data values, in some embodiments along with the business application page's URL, are sent to a server, e.g., via a web services call. The server (e.g., the web service) uses the filtered set of HTML tags to generate and return a fully formed HTTP request to invoke the companion application or service. In various embodiments, the HTTP request may include a URL associated with the companion application or service and one or more parameters, derived in various embodiments by the web service based on the filtered set of HTML tags, to be used by the companion application or service to perform an action and/or return a page in a manner determined at least in part by a calling business application context with which the one or more parameters are associated.

In some embodiments, the plug-in described above receives the fully formed HTTP request returned by the web service, and uses the request to obtain an associated companion application page, which it causes to be displayed in a new tab or window of the browser.

In the example shown in FIG. 1, for example, the web service mentioned above may reside in a same server or set of servers as the companion application or service, e.g., ECM server 118. In other embodiments, the web service may be provided via a server other than one on which the companion application is running. In addition, while in the above example the companion application or service comprises and ECM server and associated content repository (118 and 120 in the example shown in FIG. 1), in other embodiments, the companion application or service may be any external application, service, or process.

Figure 2:
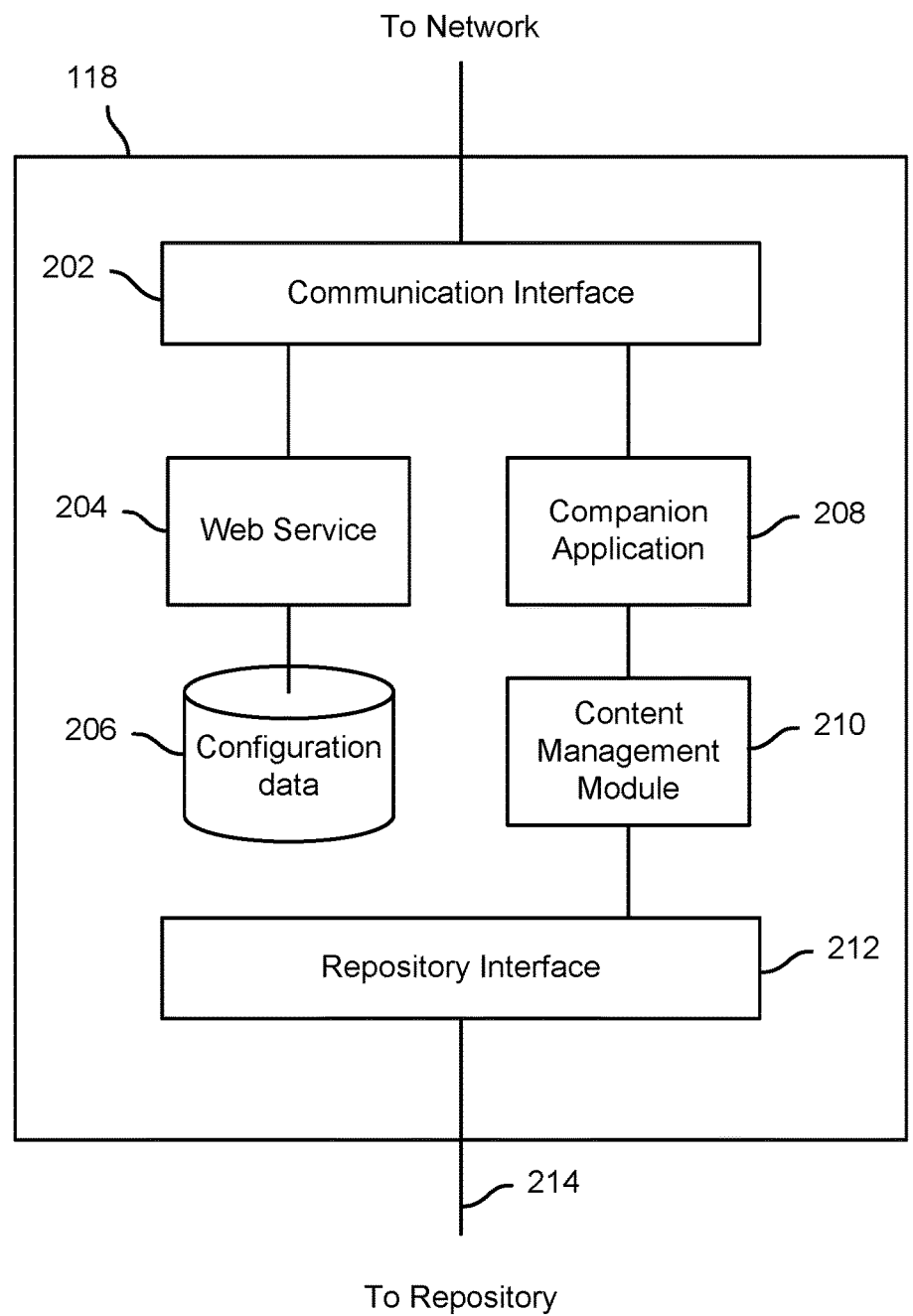
FIG. 2 is a block diagram illustrating an embodiment of an example system and service to invoke a companion application or service.

FIG. 2 is a block diagram illustrating an embodiment of a system and service to invoke a companion application or service. In the example shown, server 118 of FIG. 1 includes a communication interface 202, such a wireless or other network interface card or other device, which provides network connectivity via a network, such as network 108 of FIG. 1, to other client and/or server computer systems on the network. A web service 204 is provided and made accessible via the network through communication interface 202. Calls to web service 204 may result in configuration data 206 being used to determine how to respond to the web service call. In some embodiments, configuration data 206 may be used to determine and provide in response to the web services request an indication of a filtered set of HTML tags and associated data values that should be obtained from an instance of a calling business application page. A browser plug-in or other code that made the web services call may be configured to use the information to parse page code (e.g., HTML) for the calling application's page, e.g., a page currently in "focus" (i.e., being displayed in a visible manner by the browser) to obtain the indicated HTML tags and values. In some embodiments, the web service 204 may be invoked by sending a call that includes or otherwise provides a filtered set of HTML tags and associated values from the calling business application's page. The web service 204 uses one or more of the received filtered set of HTML tags and values, a URL of the calling application page, and configuration data 206 to generate and return a fully formed HTTP request usable by the calling client system to obtain and display from a companion application or service a display page comprising data informed by a business context of the calling application as determined based at least in part on the filtered set of HTML tags.

Referring further to FIG. 2, the server 118 includes in this example an instance of a companion application 208. In the example shown, the companion application 208 provides access, via a content management module 210 and a content repository interface 212 and associated connection 214, to content stored in a content repository such as content repository 120 of FIG. 1. In some embodiments, the companion application 208 may be responsive to an HTTP request returned to a calling client system in response to a call to web service 204. The companion application 208 may be configured to parse the request and use one or more parameters included in or otherwise received in connection with the request to generate and return a companion application display page to be displayed at the client system from which the HTTP request was received. For example, the companion application 208 may obtain from the repository one or more content items (e.g., documents, etc.) associated with a context of the calling application (e.g., a customer, account, product, purchase order, invoice, etc.) and/or associated metadata regarding same, and may include all or part of such content and/or metadata in the companion application page that is served to the client.

In various embodiments, the same companion application, such as companion application 208 of FIG. 2, may be invoked by a plurality of calling applications. For example, in some embodiments, the same companion application may be invoked from any one of a plurality of calling applications. In some embodiments, the set of filtered HTML tags obtained from the calling application's display page may be different for different calling applications (e.g., Salesforce.com® versus SAP®, and/or for different types of calling application display page (e.g., customer or account view versus invoice or purchase order view).

Figure 3:
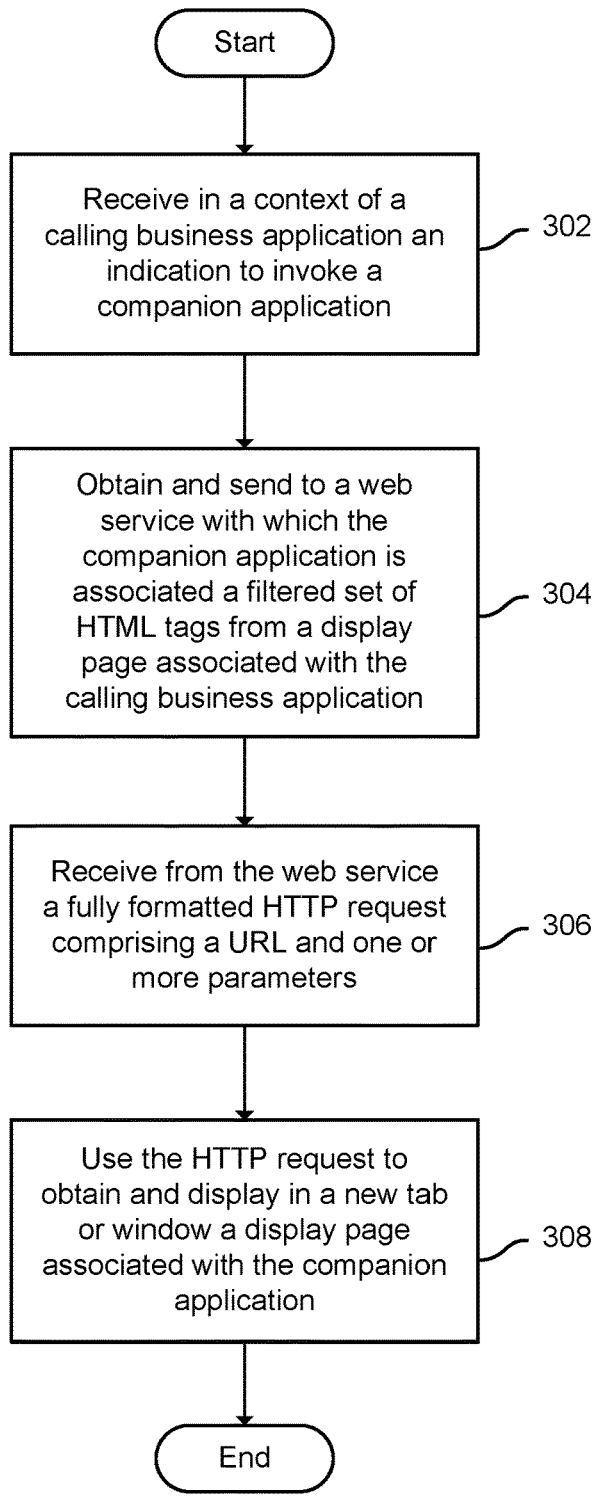
FIG. 3 is a flow chart illustrating an embodiment of an example process to invoke a companion application or service.

FIG. 3 is a flow chart illustrating an embodiment of a process to invoke a companion application or service. In various embodiments, the process of FIG. 3 may be performed by a browser plug-in or other browser-executed code installed on a client computer system, such as clients 102, 104, and 106 of FIG. 1. In the example shown, an indication to invoke a companion application is received in the context of a calling business (or other) application (302). For example, an indication that a button or other user selectable control associated with a plug-in, such as described above, has been selected by a user while viewing a display page of the calling application may be received. A filtered set of HTML tags is obtained from a display page associated with the calling application, e.g., a page that is currently being viewed by the user (i.e., is in "focus" by the browser), and in some embodiments and sub-frames of the page currently being viewed, and the filtered set of HTML tags is sent to a remote web service with which the companion application is associated (304). In some embodiments, the filtered set of HTML tags is generated by creating an array and populating the array with data values obtained from the page (and/or from sub-frames or other portions thereof). In some embodiments, sending the filtered set of HTML tags to the web service includes using data values stored in the array or some other temporary data structure to generate a string comprising the filtered set of HTML tags of for each a corresponding data value, each separated in some embodiments by a control character, such as a question mark "?". In some embodiments, a URL of a calling application page from which the filtered set of HTML tags is obtained may be included in the string. In some embodiments, a call to the web service may be made to determine which HTML tags of the calling application's page are to be included in the filtered set.

Referring further to FIG. 3, in response to sending the filtered set of HTML tags to the web service, a fully formed HTTP request is received from the web service (306). In some embodiments, the HTTP request includes a URL associated with the companion application along with one or more parameters derived from the filtered set of HTML tags. The received HTTP request is used to obtain and display in a new browser window or tab a display page associated with the companion application (308). For example, a display page containing information provided by the companion application relating to a context data of the calling application, determined based on the filtered set of HTML tags as reflected in the parameter(s) included in the HTTP request sent to retrieve the companion application page, may be received and displayed.

Figure 4:
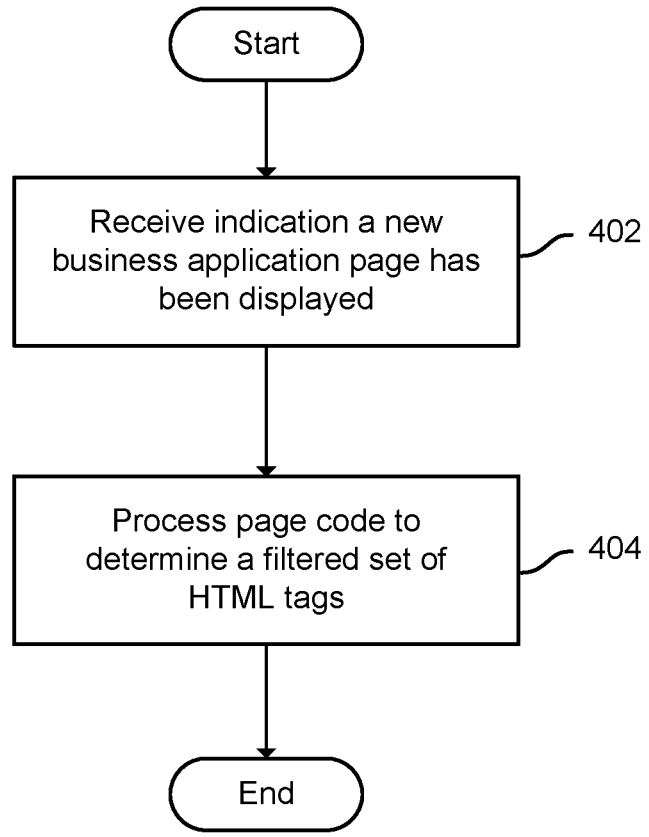
FIG. 4 is a flow chart illustrating an embodiment of an example process to generate a filtered set of HTML tags.
Figure 5:
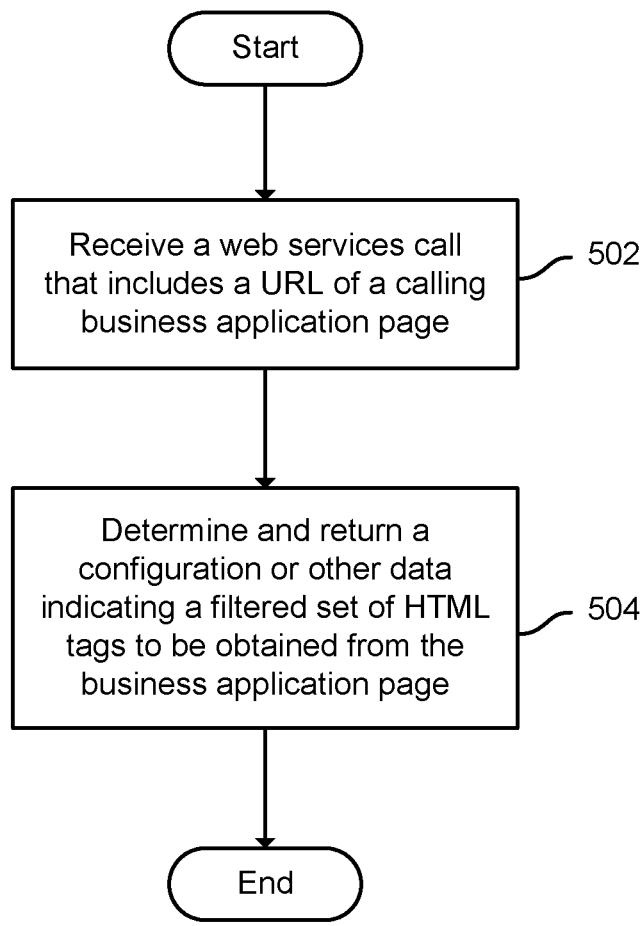
FIG. 5 is a flow chart illustrating an embodiment of an example process to determine and specify a filtered set of HTML tags to be obtained.

FIG. 4 is a flow chart illustrating an embodiment of a process to generate a filtered set of HTML tags. In various embodiments, the process of FIG. 4 may be used to implement step 304 of the process of FIG. 3. In various embodiments, the process of FIG. 3 may be performed by a browser plug-in or other code executing on a client system that is being used to access a calling application. In the example shown, an indication is received that a new business application page has been displayed (402). For example, a page may be newly downloaded and/or refreshed, e.g., from a web-based application server. In response, display page code (e.g., HTML code) of the page is processed to determine a filtered set of HTML tags (404). In some embodiments, the filtered set of HTML tags is generated by creating an array and populating the array with data values obtained from the page (and/or from sub-frames or other portions thereof). In some embodiments, obtaining the filtered set of HTML tags includes all or some of the following steps:

Access page that has focus
    Identify if page contains sub-frames
    Loop for all sub-frames
        Process all HTML tags (in order of the page)
        Filter out HTML tags that should not be sent
        Format filtered HTLM to send
    End loop FIG. 5 is a flow chart illustrating an embodiment of a process to determine and specify a filtered set of HTML tags to be obtained. In various embodiments, the process of FIG. 5 is performed by a web service, such as web service 204 of FIG. 2. A web services (or other) call including a URL of a calling business (or other) application page is received (502). The URL is used to determine and return in response to the call a configuration or other data indicating a filtered set of HTML tags and associated data values to be obtained and included in a filtered set of HTML tags (504). For example, the page URL may be used to determine based on a configuration data, such as configuration data 206 of FIG. 2, which HTML tags are to be included in the filtered set of HTML tags. In various embodiments, a first type of page associated with a particular calling application may require a different set of HTML tags to be included in the filtered set than a second type of page associated with the same calling application. In some embodiments, all of the pages of a given application may require the same filtered set of HTML tags, but corresponding and/or similar pages of other calling applications may require a different set of HTML tags, even if they are to be used to facilitate invocation of the same companion application or service.

Figure 6:
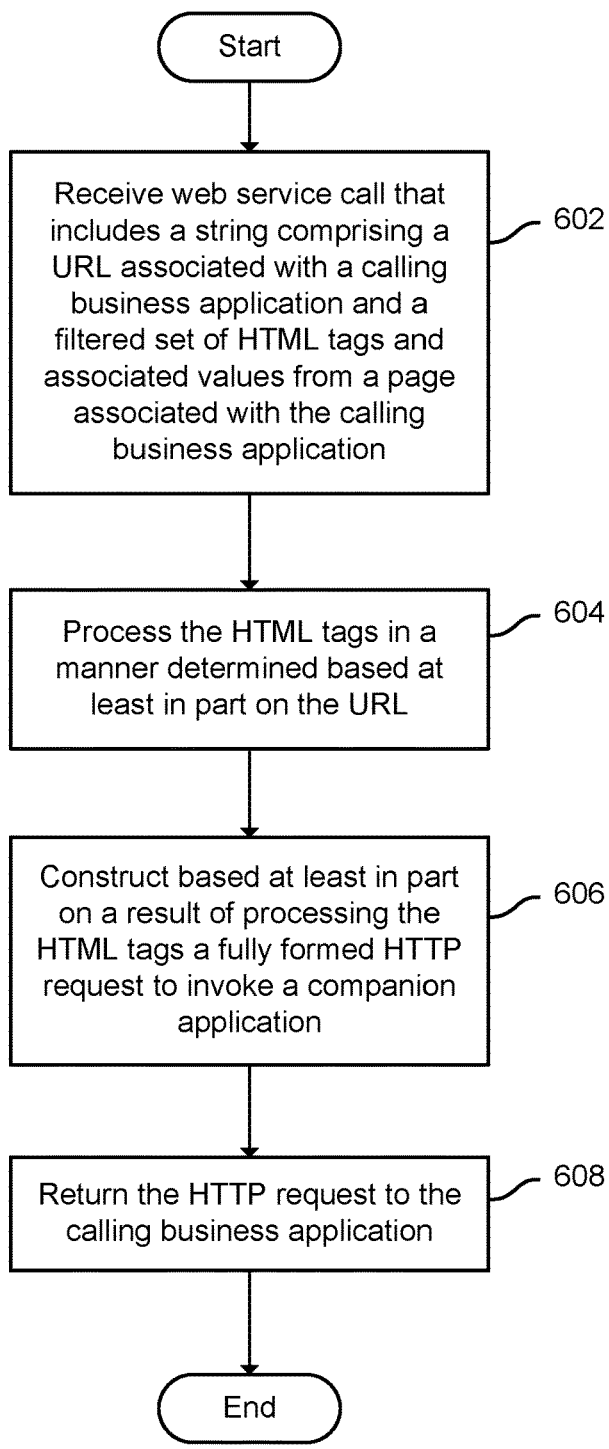
FIG. 6 is a flow chart illustrating an embodiment of an example process use a filtered set of HTML tags to provide an HTTP request to invoke a companion application.

FIG. 6 is a flow chart illustrating an embodiment of a process use a filtered set of HTML tags to provide an HTTP request to invoke a companion application. In various embodiments, the process of FIG. 5 is performed by a web service, such as web service 204 of FIG. 2. In the example shown, a web service call is received that includes a string comprising a URL associated with a calling business application and a filtered set of HTML tags and associated values from a display page associated with the business application (602). For example, the string may include for each HTML tag in the filtered set an identification of the tag and an associated value "scraped" from a displayed instance of the page. In some embodiments, the values may be separated by a special character, such as a question mark "?". The HTML tags and associated values are processed, in a manner determined based at least in part on the URL (604). For example, a companion application URL and/or one or more parameters to be used to invoke the companion application may be determined. A fully formatted HTTP request usable to invoke the companion application is constructed, based at least in part on a result of the processing of the HTML tags and associated values (606). For example, an HTTP request comprising a URL associated with the companion application and one or more parameters derived from the filtered set of HTML tags and associated values may be constructed. The HTTP request is returning to the client from which the web services request was received (608). In various embodiments, the plug-in or other code that made the web services call is configured to pass the HTTP request to a browser with which the plug-in is associated, in a manner that cause the browser to use the HTTP request to open and display the associated companion application page in a new tab or window.

Figure 7:
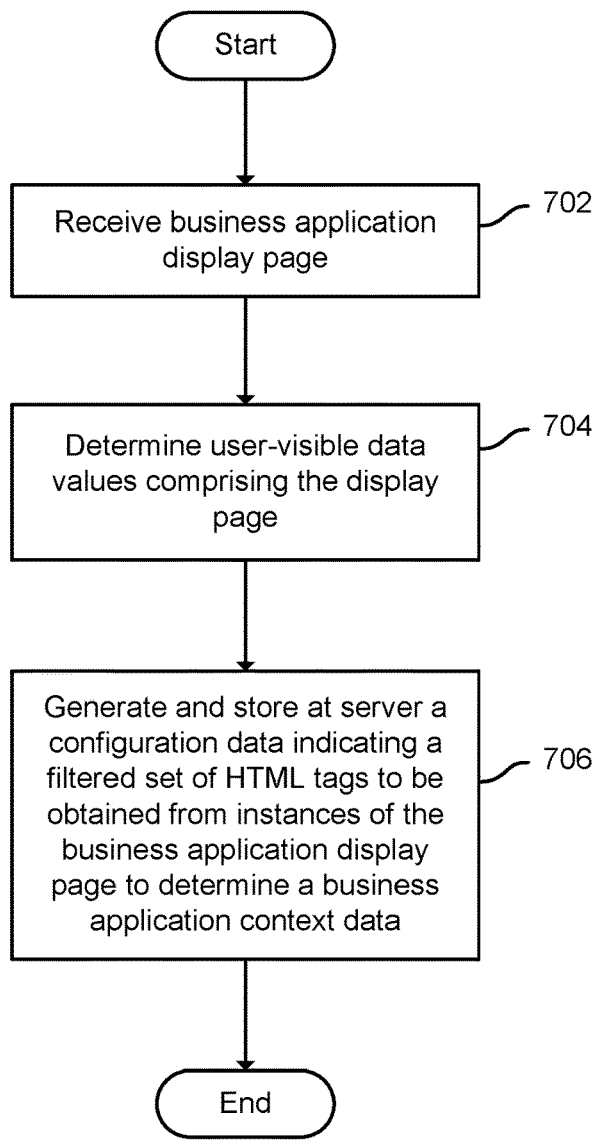
FIG. 7 is a flow chart illustrating an embodiment of an example process to determine for a given calling application display page which HTML tags to include in a filtered set of HTML tags.

FIG. 7 is a flow chart illustrating an embodiment of a process to determine for a given calling application display page which HTML tags to include in a filtered set of HTML tags. In various embodiments, the process of FIG. 7 is performed at a development and/or configuration time prior to a plug-in and/or web service being invoked as described herein, e.g., by a human software engineer or other developer. A business application display page with respect to which access to a companion application is desired to be provided as described herein is received (702). For example, a URL or other identifier of a business application page may be received. User-visible, i.e., visibly displayed, elements and associated data values comprising the page are determined (704). For example, a software tool may be used to examine in a structured way HTML or other code comprising the page, to determine which elements contain data values that are displayed to the user. A filtered set of HTML tags and associated data values which are to be determined and provided at runtime to be able to invoke a companion application from the context of the business application page is determined, and configuration data indicating the HTML tags to be included in the filtered set is generated and stored, e.g., in a configuration data store such as configuration data 206 of FIG. 2.

In various embodiments, techniques disclosed herein may be used to invoke a companion application in the context of a calling application, without require either configuration data or integration code to be installed at the client system at which the calling application is being used. In various embodiments, configuration data resides at a central server, where it can be updated in one location, if needed, e.g., if the calling application and/or its display pages are changed. Likewise, changes in an interface of the companion application can be accommodated through changes at the web service, avoiding the need to update a plurality of client systems and making it possible in some embodiments to make a change once, in one location, to enable a plurality of calling applications to continue to be able to be used to invoke the companion application via the web service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving in a context of a display page of a calling application an indication to invoke a companion application;
determining based on the calling application a filtered set of data values to be sent to a remote service, wherein the filtered set of data values includes a filtered set of hypertext markup language (HTML) tags and corresponding data values, and configuration data associated with a uniform resource locator (URL) of the display page, wherein the corresponding data values include a state of the display page, wherein the filtered set of HTML tags are filtered from a set of HTML tags comprising the display page;
sending to the remote service a call comprising the filtered set of data values, wherein the remote service is configured to use the filtered set of data values to generate a request, wherein the request comprises a URL associated with the companion application;
receiving from the remote service the request with content useable by the calling application to invoke the companion application; and
invoking the companion application.

2. The method of claim 1, wherein the indication comprises selection of a control displayed in connection with the display page.

3. The method of claim 2, wherein the display page is displayed using a browser and the control is associated with a browser plug-in.

4. The method of claim 3, wherein the browser plug-in is configured to send the call to the remote service in response to the indication.

5. The method of claim 3, wherein the browser plug-in is configured to generate the filtered set of data values.

6. The method of claim 1, wherein the display page is displayed by a browser and comprises HTML code.

7. The method of claim 6, wherein the filtered set of HTML tags includes one or more tags associated with visibly displayed page elements and for each the corresponding data value comprises a visibly displayed data value associated with that tag.

8. The method of claim 1, further comprising generating the filtered set of data values.

9. The method of claim 8, wherein generating the filtered set of data values includes populating an array or other data structure with said data values.

10. The method of claim 8, wherein generating the filtered set of data values comprises generating a string comprising said data values.

11. The method of claim 1, wherein the remote service uses the filtered set of data values to determine one or more request parameters to be embodied in the request.

12. The method of claim 1, wherein the request comprises a fully formatted hypertext transfer protocol (HTTP) request.

13. The method of claim 1, wherein using the received request to invoke the companion application comprises using the request to open in a new window or tab a companion application display page of the companion application.

14. The method of claim 1, wherein the filtered set of data values comprises a subset of display page tags of the display page and further comprising determining which display page tags are to be included in the subset.

15. The method of claim 1, wherein the companion application comprises an application or service at a remote server.

16. A system, comprising:
a processor configured to:
receive in a context of a display page of a calling application an indication to invoke a companion application;
determine based on the calling application a filtered set of data values to be sent to a remote service, wherein the filtered set of data values includes a filtered set of hypertext markup language (HTML) tags and corresponding data values, and configuration data associated with a uniform resource locator (URL) of the display page, wherein the corresponding data values include a state of the display page, wherein the filtered set of HTML tags are filtered from a set of HTML tags comprising the display page;
send to the remote service a call comprising the filtered set of data values, wherein the remote service is configured to use the filtered set of data values to generate a request, wherein the request comprises a URL associated with the companion application;
receive from the remote service the request with content useable by the calling application to invoke the companion application; and
invoke the companion application; and
a memory coupled to the processor and configured to provide the processor with instructions.

17. The system of claim 16, wherein the indication comprises selection of a control displayed in connection with the display page.

18. The system of claim 16, wherein the display page is displayed by a browser and comprises HTML code.

19. The system of claim 16, wherein the filtered set of HTML tags includes one or more tags associated with visibly displayed page elements and for each the corresponding data value comprises a visibly displayed data value associated with that tag.

20. A computer program product, the computer program product being embodied in a non-transitory computer readable storage medium and comprising computer instructions for:
receiving in a context of a display page of a calling application an indication to invoke a companion application;
determining based on the calling application a filtered set of data values to be sent to a remote service, wherein the filtered set of data values includes a filtered set of hypertext markup language (HTML) tags and corresponding data values, and configuration data associated with a uniform resource locator (URL) of the display page, wherein the corresponding data values include a state of the display page, wherein the filtered set of HTML tags are filtered from a set of HTML tags comprising the display page;
sending to the remote service a call comprising the filtered set of data values, wherein the remote service is configured to use the filtered set of data values to generate a request, wherein the request comprises a URL associated with the companion application;
receiving from the remote service the request with content useable by the calling application to invoke the companion application; and
invoking the companion application.

* * * * *